July 19, 1966  W. P. GALLAGHER ET AL  3,261,999
ELECTRIC MOTOR CONSTRUCTION
Filed May 22, 1964  3 Sheets-Sheet 1
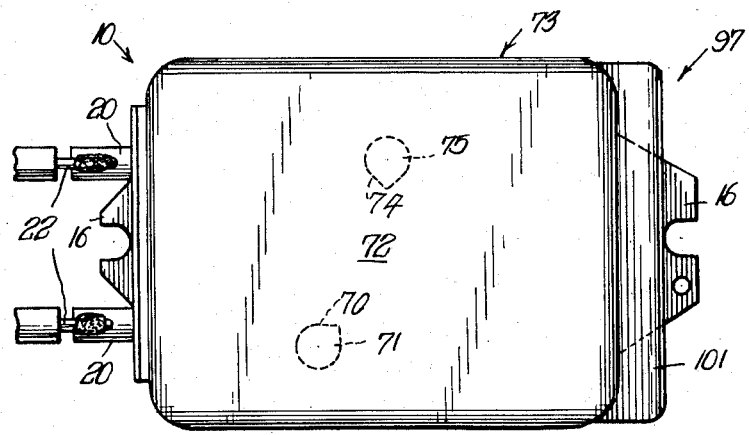
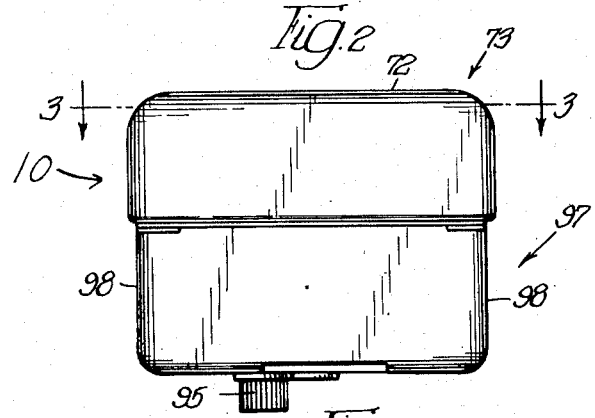
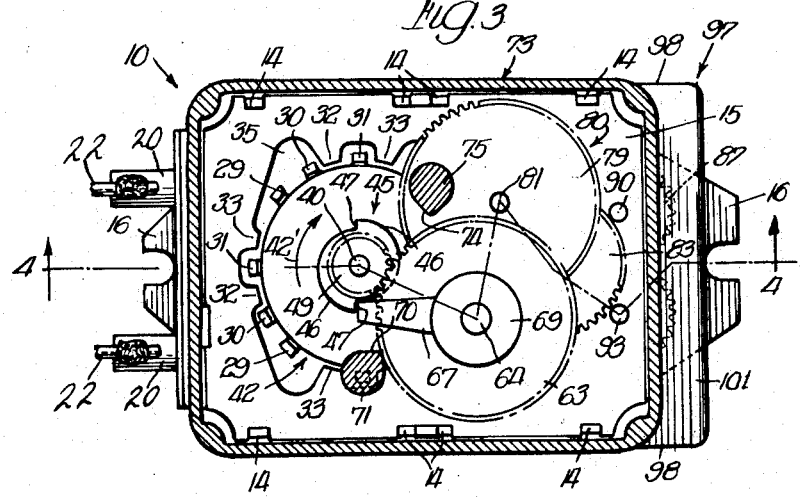

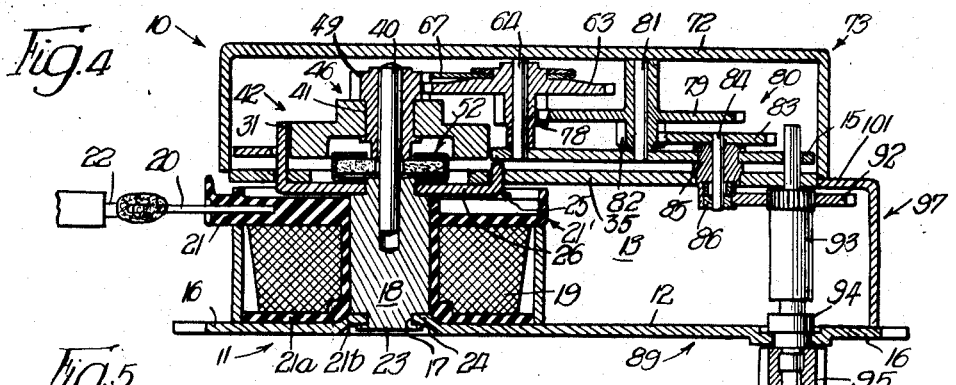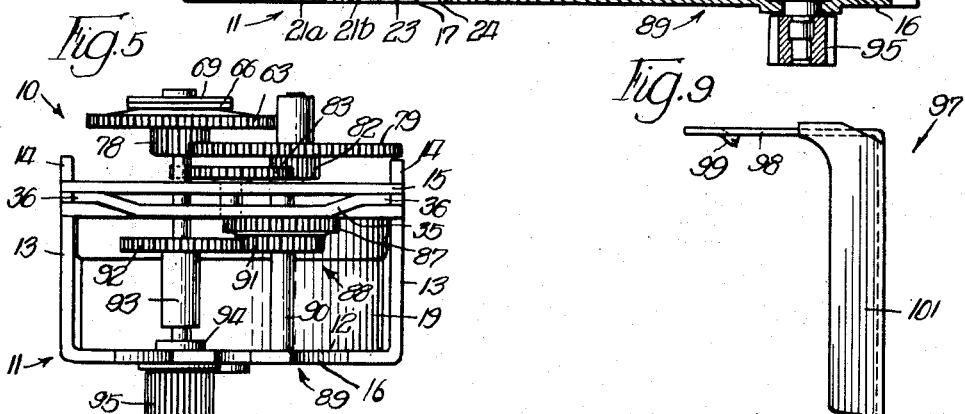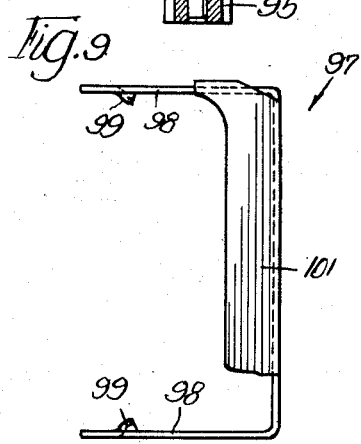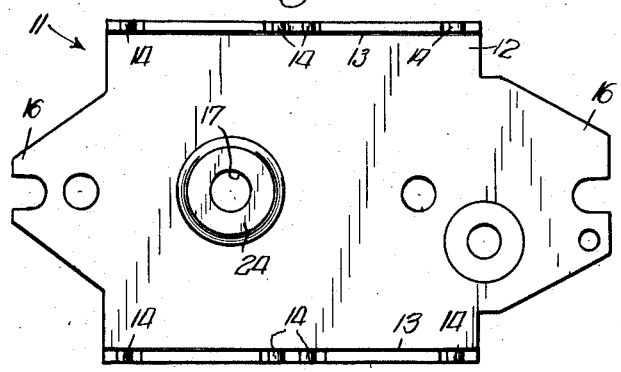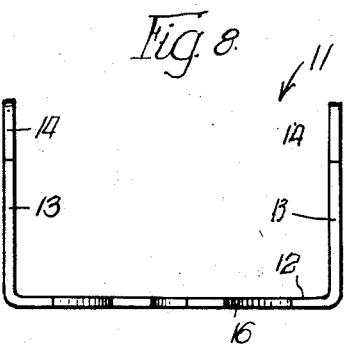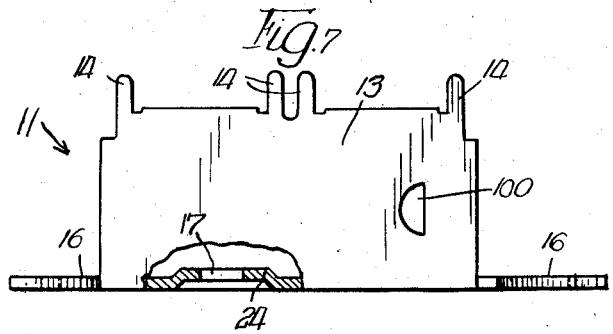

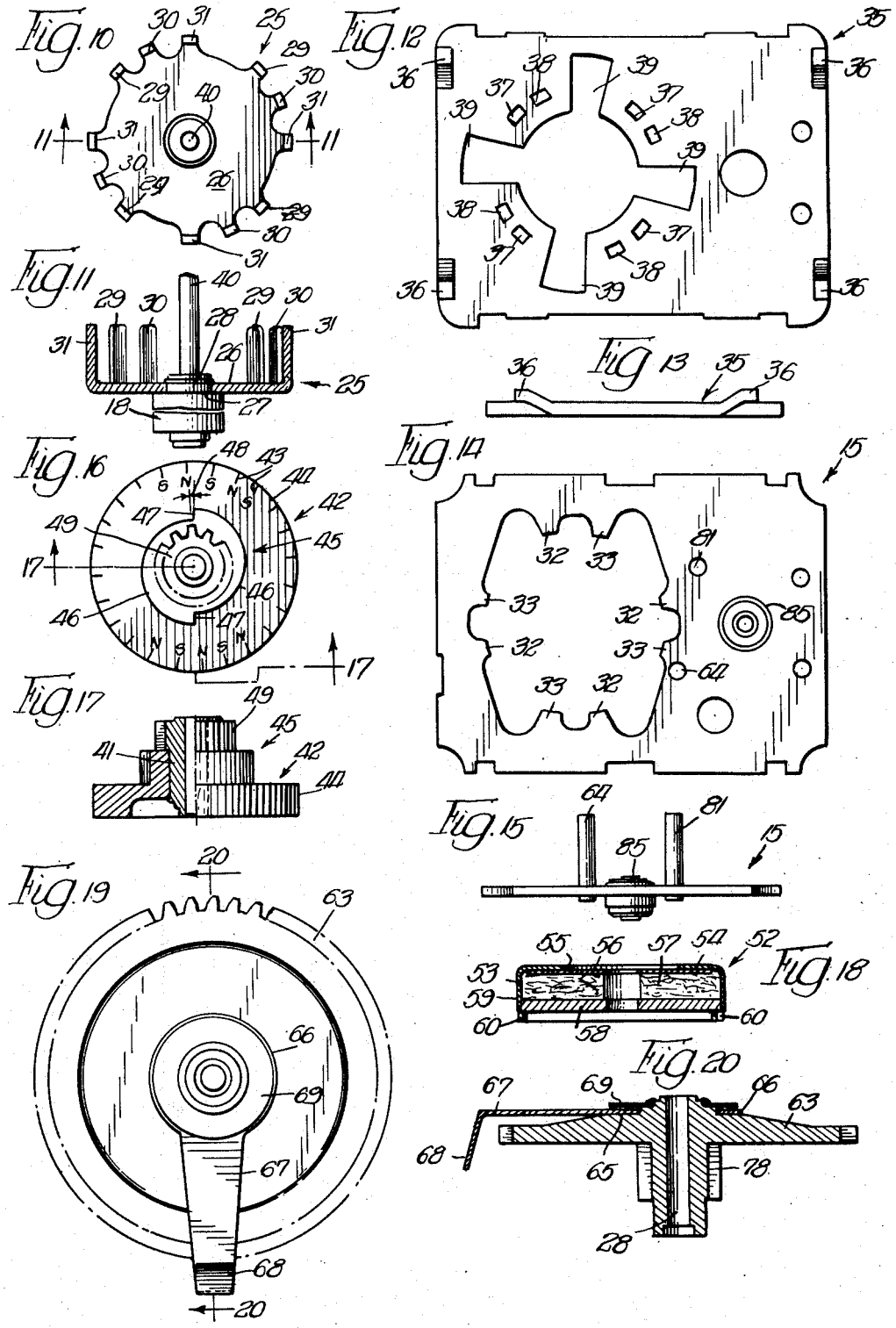

United States Patent Office 3,261,999
Patented July 19, 1966

3,261,999
ELECTRIC MOTOR CONSTRUCTION
William P. Gallagher, Coral Gables, and Richard J. Dykinga, Miami, Fla., assignors to International Register Company, Chicago, Ill., a corporation of Illinois
Filed May 22, 1964, Ser. No. 369,412
15 Claims. (Cl. 310—164)

This application is a continuation-in-part of application Serial No. 300,433, filed August 7, 1963, now abandoned.

This invention relates, generally, to dynamo electric devices and it has particular relation to small synchronous motors of the toroidal coil type used for driving timing devices and operating switches at predetermined times and for predetermined time intervals.

Among the objects of this invention are: To provide a magnetic field structure having a generally rectangular cross section for a small synchronous motor particularly arranged and adapted for driving timing devices and the like; to form the magnetic field structure in such manner as to cause a minimum of alternating current hum when it is located on a metallic support plate or the like and the winding is energized from an alternating current source; to arrange inner and outer field plates with pole tips extending therefrom in interspersed relation around a rotor of the permanent magnet type with a rectangular shading plate between the field plates and in shading relation to certain of the pole tips extending from the inner field plate; to space certain of the pole tips non-uniformly in order to prevent stalling of the permanent magnet rotor when it is stopped which would interfere with its starting to run; to insure that the rotor runs only in one direction by providing a cam on the rotor having a radial shoulder arranged to be engaged by a resilient detent should the rotor start in a reverse direction to prevent continued rotation in such direction and to impel it to rotate in a forward direction; to mount the resilient detent on an arm having frictional engagement with a face of a gear driven by the rotor and movable with the gear when the rotor starts in the reverse direction to position the detent in the path of the radial shoulder on the cam; to limit the movement of the arm carrying the detent to a predetermined position when the rotor starts in the forward direction; to locate the radial shoulder on the cam in predetermined relation to the magnetic poles along the periphery of the rotor; to secure the shading plate in position in such manner that it cannot vibrate when the magnetic circuit is energized from an alternating current source; and to provide for receiving a wide variety of gear trains inside and outside of the rectangular magnetic field structure whereby an output pinion can be driven at a corresponding number of speeds, depending upon which gear train combination is used.

In the drawings:

FIG. 1 is a top plan view, at an enlarged scale, of a motor construction embodying the present invention.

FIG. 2 is a view, in end elevation, of the motor construction shown in FIG. 1.

FIG. 3 is a horizontal sectional view taken generally along the line 3—3 of FIG. 2 and showing a motor construction arranged to have the rotor run in a clockwise direction.

FIG. 4 is a vertical sectional view taken generally along the line 4—4 of FIG. 3, it being noted that the section line is taken through the pins or shafts on which various rotatable members are mounted which are not in alignment.

FIG. 5 is a view, in end elevation, of the motor construction shown in FIGS. 1 and 2, the cover and closure cap having been removed.

FIG. 6 is a top plan view of the rectangular mounting plate that forms a part of the magnetic circuit for the motor construction.

FIG. 7 is a view, in side elevation, of the mounting plate shown in FIG. 6.

FIG. 8 is a view, in end elevation, of the mounting plate shown in FIG. 6.

FIG. 9 is a top plan view of the closure cap that is employed for covering the open end of the rectangular gear box which is formed by the magnetic circuit that is utilized in the motor construction.

FIG. 10 is a top plan view of the inner field plate.

FIG. 11 is a vertical sectional view, taken generally along the line 11—11 of FIG. 10, and showing a portion of the core on which the field plate is mounted.

FIG. 12 is a top plan view of the shading plate that is formed of non-magnetic and good electrical conducting material, such as aluminum.

FIG. 13 is a view, in end elevation, of the shading plate shown in FIG. 12.

FIG. 14 is a top plan view of the outer field plate.

FIG. 15 is a view, in end elevation, of the field plate shown in FIG. 14.

FIG. 16 is a top plan view of the rotor and shows the cam arrangement that prevents running of the rotor in a reverse direction.

FIG. 17 is a vertical sectional view taken generally along the line 17—17 of FIG. 16.

FIG. 18 is a vertcial sectional view of the oil cup assembly which is located underneath the rotor.

FIG. 19 is a top plan view of a gear driven by the rotor and shows how the arm carrying the detent, which prevents reverse rotation of the rotor, is mounted.

FIG. 20 is a vertical sectional view taken generally along the line 20—20 of FIG. 19.

Referring now particularly to FIGS. 1, 2 and 3 of the drawings, it will be observed that the reference character 10 designates, generally, an electric motor construction embodying the present invention.

The electric motor construction 10 includes a rectangular mounting plate, shown generally at 11 in FIGS. 6, 7 and 8, and it is formed of a suitable magnetic material such as steel. The mounting plate 11 has a flat bottom 12 and upstanding parallel sides 13—13. It will be noted that the mounting plate 11, particularly as shown in FIG. 8, provides a flat bottom U-shape.

Tangs 14 extend upwardly from the upper edges of the sides 13—13 for securing an outer field plate, shown generally at 15, in FIGS. 14 and 15 of the drawings, securely in position to the sides 13—13 along their upper edges. The outer field plate 15 is formed of magnetic material such as steel and is generally rectangular in configuration so that, when it is secured in position along the upper edges of the sides 13—13, it forms with the mounting plate 11 an enclosure having a generally rectangular cross section. The ends 16—16 of the flat bottom 12 are slotted in order to facilitate mounting the electric motor construction 10 on a suitable support.

Intermediate, for example midway, the sides 13—13 of the mounting plate 11 there is provided an opening 17 for receiving the lower end of a cylindrical magnetic core 18 as shown more clearly in FIG. 4. The core 18 preferably is formed of steel. Surrounding it is an energizing winding 19 that is provided with terminals 20—20 which are embedded in an insulating plate 21 of a bobbin 21' within which the turns of the winding 19 are wound. Conductors 22—22 are secured to the terminals 20—20 for connecting the winding 19 for energization to a suitable source of alternating current, such as a 60 cycle 115 volt source.

The reduced diameter lower end 23 of the core 18 extends into and is suitably secured in the opening 17 which is located in an upwardly directed embossed portion 24 of the flat bottom 12. This spaces the surface of the lower end 23 slightly above the plane containing the undersurface of the flat bottom 12 and thus reduces hum that otherwise is caused when it is positioned on a separate metallic mounting plate and the winding 19 is energized from an alternating current source. The lower flange 21a of the bobbin 21' is suitably recessed at 21b to accommodate the embossed portion 24. The alternating current hum is further minimized by having that portion of the flat bottom 12 coextensive with the winding 19 extend uninterruptedly from the lower end 23 of the core 18 to the upstanding parallel sides 13—13.

At the upper end of the magnetic core 18 there is positioned an inner field plate that is indicated, generally, at 25 in FIG. 10. The inner field plate 25 is formed preferably of magnetic material, such as steel, and it has a central section 26 that is flat and is provided with a central opening 27 for receiving a hub portion 28 of the magnetic core 18. It will be understood that the upper end of the hub 28 is suitably peened over to secure the central section 26 thereto.

Extending upwardly along the periphery of the central section 26 are pole tips 29, 30 and 31, there being three pole tips for each quadrant of the central section 26. Preferably the pole tips 29, 30 and 31 are non-uniformly located along the circular periphery of the central section 26. For illustrative purposes it is pointed out that the arcuate distance between the pole tips 31 and 29 is 42½°. The arcuate distance between the pole tips 29 and 30 is 20° while the arcuate distance between the pole tips 30 and 31 is 27½°.

The pole tips 29, 30 and 31 are interspersed among radially inwardly extending pole tips 32 and 33 which, as shown in FIG. 14, are located on the outer field plate 15 in pairs and are arranged, as indicated in FIG. 3 when assembled with the inner field plate 25, to have the pole tip 31 of the latter between the pole tips 32 and 33. Preferably the pole tip 31 individual to each pair of pole tips 32 and 33 is located midway therebetween or is located along the circle including the pole tips 29, 30 and 31 equidistant from the pole tips 32 and 33 which are arcuately spaced apart 30°. Now it will be observed that the pole tips 29, 30, 31, 32 and 33 are located along a circle the center of which is located along a line extending through the vertical axis of the cylindrical core 18. Also, as indicated, these pole tips are non-uniformly spaced in order to prevent a stalling or locking action with the poles of a permanent magnet rotor, to be described, with which they cooperate on energization of the winding 19. Because of the non-uniform spacing of the pole tips in the manner described, the rotor tends to oscillate on energization of the winding 19 since it is subjected to unsymmetrical magnetic forces in contradistinction to remaining in a fixed position if a symmetrical arrangement of the pole tips 29 to 33, inclusive, were used.

It is desirable that the magnetic field from the pole tips 29 and 30 be shifted from the magnetic field extending from the pole tips 31. For this purpose a shading plate, indicated generally at 35 in FIGS. 12 and 13 and formed of nonmagnetic good conducting material such as aluminum, is employed. It will be noted that the shading plate 35 is generally rectangular in configuration and corresponds, generally, to the shape of the outer field plate 15. The shading plate 35 is arranged to be located underneath the outer field plate 15 and between the inner sides of the parallel sides 13—13 of the mounting plate 11 as shown in FIG. 5. Tangs 36—36 are struck from the ends of the shading plate 35 so that, when it is assembled, as shown in FIG. 5 between the parallel sides 13—13 and underneath the outer field plate 15 by deformation of the tangs 14, it will be held securely in position and against vibration when the winding 19 is energized from a source of alternating current.

It will be noted in FIG. 12 that the shading plate 35 is provided with openings 37 and 38 for receiving therethrough the pole tips 29 and 30 as shown in FIG. 3. These pole tips 29 and 30 then are shaded with respect to the pole tips 31 which extend through slots 39 in the shading plate 35. Attention is called to the fact that there are eight shaded pole tips and four unshaded pole tips on the inner field plate 25. Also there are eight unshaded pole tips on the outer field plate 15. This provides a total of twenty pole tips for the stator construction with the pole tips being non-uniformly spaced along a circle, the center of which is the vertical axis of the cylindrical magnetic core 18.

Referring now particularly to FIGS. 4, 10 and 11 of the drawings, it will be noted that a pin or shaft 40 is secured to and extends upwardly from the cylindrical magnetic core 18 along its vertical axis so that the axis of the pin or shaft 40 is coaxial with the circle along which the pole tips 29 to 33, inclusive, are located. A bearing hub 41 is rotatably mounted on the pin or shaft 40 and it carries a rotor, indicated generally at 42 in FIGS. 16 and 17, that is formed preferably of ceramic permanent magnetic material. As here shown the rotor 42 is polarized at 43 along the periphery 44 so as to provide uniformly spaced north and south poles. For illustrative purposes it is pointed out the 12 north and 12 south poles are provided in alternate relation along the periphery 44 making a total of twenty-four poles which, when cooperating with the twenty pole tips 29 to 33, inclusive, with the the winding 19 energized from a 60 cycle source, causes the rotor 42 to run at a speed of 300 r.p.m. It will be understood that other combinations of poles and pole tips can be employed to cause the rotor 42 to run at different speeds.

In order to insure that the rotor 42 will run in only one direction there is formed integrally therewith a cam that is indicated, generally, at 45. The cam 45 includes cam surfaces 46—46 which terminate in radially extending shoulders 47—47. Since it is desirable that there be a predetermined relationship between the shoulders 47—47, which are located along a diameter of the rotor 42, and the permanent magnet poles 43, the diameter through diametrically opposite poles, i.e., two north poles, is displaced at a slight angle, indicated at 48, from the diameter along which the shoulders 47—47 are located. For illustrative purposes it is pointed out that the angle 48 may be 2½°. Also formed integrally with the bearing hub 41, which is brass, is a pinion 49 by means of which torque from the rotor 42 is transmitted in a manner to be described.

It is desirable that there be lubrication for the bearing hub 41 on the stationary pin or shaft 40. For this purpose the oil cup assembly, as shown generally at 52 in FIG. 18, is provided. The assembly 52 includes a cup shaped housing 53 of a non-magnetic material, such as aluminum, which is provided with a lip 54 around a central opening 55. Underneath the lip 54 is an apertured plate 56 of plastic material against which the lower end of the bearing hub 41 bears. Below the plate 56 is a filling 57 of lubricant absorbing material which has a central aperture to receive the pin or a shaft 40. An apertured closure plate 58 overlies the under side of the filling 57 of lubricant absorbing material and is secured in place within a rim 59 of the cup shaped housing 53 by having the rim 59 deformed as indicated at 60—60.

As shown in FIGS. 3 and 4 the pinion 49 that rotates with the rotor 42, is arranged to drive the gear 63 which is mounted for rotation on a pin or shaft 64 that is carried by and extends upwardly from the upper surface of the outer field plate 15. FIGS. 19 and 20 show the details of construction of the gear 63. Here it will be observed that the gear 63 has an annular surface 65 on its upper side for frictionally receiving a flat hub portion 66 of an arm 67 which carries a detent 68 at its distal end. Preferably a slight coating of lubricant is provided on the juxtaposed surfaces of the gear 63 and the flat hub portion 66 to the end that the arm 67 is relatively freely rotatable with respect to the gear 63, but when the arm 67 is not held against rotation, it will rotate conjointly with the gear 63. A retaining washer 69, secured to the central portion of the gear 63, overlies the flat hub portion 66 of the arm 67 and prevents its escape from the gear 63 while permitting relative rotation therebetween.

It is assumed that a clockwise rotation of the rotor 42 is desired as indicated by the arrow 42′, FIG. 3. If the rotor starts to rotate in a counterclockwise direction, the gear 63 driven by the pinion 49 will rotate in a clockwise direction and, because of the friction between the surface 65 on the gear 63 and the flat hub portion 66, the arm 67 will be swung to the position shown in FIG. 3 against one or the other of the cam surfaces 46—46. Continued rotation of the rotor 42 in the counterclockwise direction finally brings one or the other of the shoulders 47—47 into direct engagement with the other side of the detent 68. Since the detent 68 is resilient, the impact tends to stress it and, in return the rotor 42 rebounds through the interaction of the detent 68 and the particular shoulder 47 engaged thereby. The action is such that the rotor 42 is caused to rotate in a clockwise direction as indicated by the arrow 42′.

It is desirable that the movement of the arm 67 from a non-operating position to a position in engagement with one or the other of the shoulders 47—47 be at a minimum in order to insure prompt starting of the rotor 42 in the forward direction. Accordingly provision is made for limiting the movement of the arm 67 in a counterclockwise direction when the rotor 42 rotates in a clockwise direction. For this purpose a surface 70 on a stop boss 71, which depends from the underside of the top 72 of a cover, shown generally at 83 and preferably formed of plastic, is engaged by one side of the arm 67. In the normal running condition of the rotor 42, the arm 67 is held against rotation with the gear 63 by engagement with the surface 70 on the stop boss 71.

In the event that it is desired to have the rotor 42 normally rotate in a counterclockwise direction, then the cam 45 is modified so that the shoulders 47—47 face in the opposite direction with the cam surfaces 46—46 being correspondingly located and arranged. When the motor for the counterclockwise operation is assembled, the arm 67 is positioned on the side of the cam 45, opposite to that shown in FIG. 3, and it is arranged to engage a surface 74 on a stop boss 75 which depends from the under side of the top 72 of the cover 73.

The electric motor construction 10 employing the magnetic circuit having a generally rectangular cross section makes it possible to couple a large combination of gear trains to the pinion 49. The gear trains as now to be described are illustrative of some of these combinations.

The gear 63, for one combination, is provided with a relatively short pinion 78 on its underside, FIG. 4, and it is arranged to drive a reduction gear 79 that may be formed of a suitable plastic. The reduction gear 79 forms the first gear of a gear train, indicated generally at 80, that is located on the upper side of the outer field plate 15. The reduction gear 79 is mounted for rotation on a pin or shaft 81 that is secured to and extends upwardly from the upper side of the outer field plate 15. Formed integrally with the reduction gear 79 is a pinion 82 that is arranged to drive a transfer gear 83 that is mounted for rotation with a pin or shaft 84 that is journaled in a bearing 85 that is located between the outer field plate 15 and the shading plate 35. At the lower end of the pin or shaft 84 there is a pinion 86 that is in driving engagement with a gear 87, FIG. 5, that constitutes one gear of a gear train, indicated generally at 88, and located in a rectangular gear box, shown generally at 89, which is formed by the flat bottom 12 of the mounting plate 11, its parallel sides 13—13, and the shading plate 35. The gear 87 is freely rotatably mounted on a pin or shaft 90 that extends between the flat bottom 12 and the outer field plate 15 and through the shading plate 35. A pinion 91 is rotatable with the gear 87 on the pin or shaft 90 and is arranged to drive a gear 92 that is fact on a pin or shaft 93 which is rotatably mounted in a bearing 94 that is carried by the flat bottom 12 of the mounting plate 11. The upper end of the pin or shaft 93 is guided in suitable apertures in the shading plate 35 and the outer field plate 15. An external pinion 95 is fast on the lower end of the pin or shaft 93 and can be connected to drive any suitable mechanism as may be desired.

As pointed out, many combinations of gear trains can be utilized when the motor construction 10 disclosed herein is employed. Instead of driving from the pinion 78 to the reduction gear 79, the pinion 78 can be extended so that it will have direct driving engagement with the transfer gear 83. Such a modification will increase the speed of the external pinion 95. If desired provision can be made for driving the gear 92 directly from the pinion 86. Additional pins or shafts can be positioned in the rectangular gear box 89 with various gear sets thereon to provide any particular speed that is desired for the external pinion 95. Additional gear sets can be provided on the pin or shaft 90 for this purpose. Various other combinations are obvious.

With a view to closing the open end of the rectangular gear box 89 opposite the winding 19, a C-shaped closure cap, shown generally at 97 in FIGS. 4 and 9, is provided. The cap 97 has parallel sides 98—98 that are arranged to overlie the outer surfaces of adjacent portions of the parallel sides 13—13 of the mounting plate 11. Lugs 99—99 are struck inwardly from the sides 98—98 and are arranged to be received in semi-circular openings, one of which is indicated at 100 in FIG. 7 and located in the sides 13—13. A cover section 101 is bent over from the central part of the closure cap 97 to overlie the sides 98—98 for completing the closure.

What is claimed as new is:

1. An electric motor construction comprising: a magnetic field structure including: a rectangular mounting plate having upstanding generally parallel sides along one pair of opposite edges and providing a flat bottom U-shape, a core extending upwardly from and secured at its lower end to said flat bottom of said mounting plate intermediate said sides, an inner field plate secured to the upper end of said core and having a plurality of pole tips extending at right angles away from said core in spaced relation along a circle whose diameter is less than the distance between said sides of said mounting plate, and an outer field plate interconnecting the distal edges of said sides of said mounting plate, forming therewith a housing having a rectangular cross section, and having radially inwardly extending pole tips interspersed among said pole tips on said inner field plate along said circle; a shaft extending axially of said core and of said circle along which said pole tips are located, a permanent magnet rotor on said shaft rotatable within said pole tips and having a plurality of magnetic poles along its periphery, a cam rotatable with said rotor and having a radially extending shoulder, a pinion rotatable with said rotor, a gear driven by said pinion, an arm rotatable about the axis of rotation of said gear and having frictional engagement therewith, a detent carried by said arm for engagement with said shoulder on rotation of said rotor in a reverse direction to prevent continued rotation thereof in said reverse direction, and a winding on said core between said mounting plate and said inner field plate adapted to be connected for energization to a source of alternating current.

2. The invention, as set forth in claim 1, wherein the detent is resilient and, on engagement with the shoulder, causes the rotor to rebound and rotate in a forward direction.

3. The invention, as set forth in claim 1, wherein stop means cooperate with the arm and limit rotation thereof with the gear beyond a predetermined extent.

4. The invention, as set forth in claim 1, wherein the shoulder on the cam has a predetermined angular relation with respect to the magnetic poles of the rotor.

5. The invention, as set forth in claim 1, wherein: the magnetic poles along the periphery of the rotor are uniformly spaced, and certain of the pole tips on the inner field plate are non-uniformly spaced to prevent stalling of said rotor on energization of the winding.

6. An electric motor construction comprising: a magnetic field structure including: a mounting plate having upstanding sides and providing a flat bottom U-shape, a core extending upwardly from and secured at its lower end to said flat bottom of said mounting plate intermediate said sides, an inner field plate secured to the upper end of said core and having a plurality of pole tips extending at right angles away from said core in spaced relation along a circle whose diameter is less than the distance between said sides of said mounting plate, said pole tips on said inner field plate being in groups of three in each quadrant with two adjacent pole tips of each group being relatively close and the third pole tip spaced relatively far from the adjacent one of said two pole tips, and an outer field plate interconnecting the distal edges of said sides of said mounting plate, forming therewith a housing having a rectangular cross section, and having radially inwardly extending pole tips interspersed among said pole tips on said inner field plate along said circle; a shaft extending axially of said core and of said circle along which said pole tips are located, a permanent magnet rotor on said shaft rotatable within said pole tips and having a plurality of magnetic poles along its periphery, and a winding on said core between said mounting plate and said inner field plate adapted to be connected for energization to a source of alternating current.

7. The invention, as set forth in claim 6, wherein the outer field plate has a pair of pole tips individual to each third pole tip on the inner field plate with said third pole tip being positioned therebetween.

8. An electric motor construction comprising: a magnetic field structure including: a mounting plate having upstanding sides and providing a flat bottom U-shape, a core extending upwardly from and secured at its lower end to said flat bottom of said mounting plate intermediate said sides, an inner field plate secured to the upper end of said core and having a plurality of pole tips extending at right angles away from said core in spaced relation along a circle whose diameter is less than the distance between said sides of said mounting plate, and an outer field plate interconnecting the distal edges of said sides of said mounting plate, forming therewith a housing having a rectangular cross section, and having radially inwardly extending pole tips interspersed along said pole tips on said inner field plate along said circle; a shading plate between said inner and outer field plates and between said sides of said mounting plate in shading relation to certain of said pole tips on said inner field plate, a shaft extending axially of said core and of said circle along which said pole tips are located, a permanent magnet rotor on said shaft rotatable within said pole tips and having a plurality of magnetic poles along its periphery, a winding on said core between said mounting plate and said inner field plate adapted to be connected for energization to a source of alternating current, said shading plate being spaced from the underside of said outer field plate, and tangs struck from said shading plate bear against said underside of said outer field plate and hold it against vibration when said winding is energized.

9. An electric motor construction comprising: a magnetic field structure including: a rectangular mounting plate having upstanding generally parallel sides along one pair of opposite edges and providing a flat bottom U-shape, a core extending upwardly from and secured at its lower end to said flat bottom of said mounting plate intermediate said sides, an inner field plate secured to the upper end of said core and having a plurality of pole tips extending at right angles away from said core in spaced relation along a circle whose diameter is less than the distance between said sides of said mounting plate, and an outer field plate interconnecting the distal edges of said sides of said mounting plate, forming therewith a housing having a rectangular cross section, and having radially inwardly extending pole tips interspersed among said pole tips on said inner field plate along said circle; a shaft extending axially of said core and of said circle along which said pole tips are located, a permanent magnet rotor on said shaft rotatable within said pole tips and having a plurality of magnetic poles along its periphery, a winding on said core between said mounting plate and said inner field plate adapted to be connected for energization to a source of alternating current, said mounting plate together with its sides and said outer field plate extending to one side of said winding and providing a gear train space having a generally rectangular cross section, at least one gear train in said gear train space, and means operatively interconnecting said rotor and said gear train.

10. The invention, as set forth in claim 9, wherein the means operatively interconnecting the rotor and the gear train in the gear train space is a gear train on the upper side of the outer field plate extending into said gear train space.

11. An electric motor construction comprising: a magnetic field structure including: a mounting plate having upstanding sides and providing a flat bottom U-shape, a core extending upwardly from and secured at its lower end to said flat bottom of said mounting plate intermediate said sides, an inner field plate secured to the upper end of said core and having a plurality of pole tips extending at right angles away from said core in spaced relation along a circle whose diameter is less than the distance between said sides of said mounting plate, and an outer field plate interconnecting the distal edges of said sides of said mounting plate, forming therewith a housing having a rectangular cross section, and having radially inwardly extending pole tips interspersed among said pole tips on said inner field plate along said circle; a shaft extending axially of said core and of said circle along which said pole tips are located, a permanent magnet rotor on said shaft rotatable within said pole tips and having a plurality of magnetic poles along its periphery, and a winding on said core between said mounting plate and said inner field plate adapted to be connected for energization to a source of alternating current, that portion of said flat bottom of said mounting plate coextensive with said winding extending without interruption from said core to said upstanding sides.

12. An electric motor construction comprising: a magnetic field structure including: a mounting plate having upstanding sides and providing a flat bottom U-shape, a core extending upwardly from and secured at its lower end to said flat bottom of said mounting plate intermediate said sides, an inner field plate secured to the upper end of said core and having a plurality of pole tips extending at right angles away from said core in spaced relation along a circle whose diameter is less than the distance between said sides of said mounting plate, and an outer field plate interconnecting the distal edges of said sides of said mounting plate, forming therewith a housing having a rectangular cross section, and having radially inwardly extending pole tips interspersed among said pole tips on said inner field plate along said circle; a shaft extending axially of said core and of said circle along which said pole tips are located a permanent magnet rotor on said shaft rotatable within said pole tips and having a plurality of magnetic poles along its periphery, and a winding on said core between said mounting plate and said inner field plate adapted to be connected for energization to a source of alternating current, said flat bottom of said mounting plate having an upwardly embossed portion with the lower end of said core secured thereto.

13. The invention, as set forth in claim 12, wherein the embossed portion has a central aperture, and the core has a reduced diameter lower end extending into said aperture with the lower end surface above the plane of the lower surface of the flat bottom of the mounting plate.

14. Means for permitting rotation of a permanent magnet rotor in one direction when the associated stator is energized by alternating current and preventing rotation of said rotor in the opposite direction comprising, a cam for rotation with said rotor having a radially extending shoulder, a pinion for rotation with said rotor, a gear driven by said pinion having an end surface in a plane transverse to the axis of rotation of said cam, and an arm having a flat portion journaled for rotation about the axis of rotation of said gear and flatwise frictionally engaging said end surface, the distal end of said arm being engageable with said shoulder on rotation of said rotor in said opposite direction to prevent continued rotation thereof in said opposite direction.

15. A self starting synchronous motor comprising, a field structure including outer and inner field plates having pole tips unequally spaced along a circle, an energizing winding for said field structure for connection to a source of alternating current, a permanent magnet rotor having a plurality of equally spaced permanent poles of opposite polarities and rotatable by the alternating magnetic field from said pole tips, a cam rotatable with said rotor having a radially extending shoulder, a pinion rotatable with said rotor, a gear driven by said pinion and an arm rotatable about the axis of rotation of and frictionally engaging said gear, the distal end of said arm being engageable with said shoulder to prevent rotation of said rotor in one direction in a position of said rotor with respect to said pole tips in which said rotor is positively vibrated by the alternating magnetic flux whereby said rotor starts to rotate in the opposite direction.

References Cited by the Examiner
UNITED STATES PATENTS

| | | | |
|---|---|---|---|
| 2,874,809 | 2/1959 | Poole | 310—164 |
| 2,951,957 | 9/1960 | Eigeman | 310—164 |

MILTON O. HIRSHFIELD, *Primary Examiner.*

ORIS L. RADER, *Examiner.*

L. L. SMITH, *Assistant Examiner.*